June 5, 1923.
H. G. FRAZIER
WAGON DUMP BODY LATCH
Filed Aug. 10, 1922
1,457,357
2 Sheets-Sheet 1
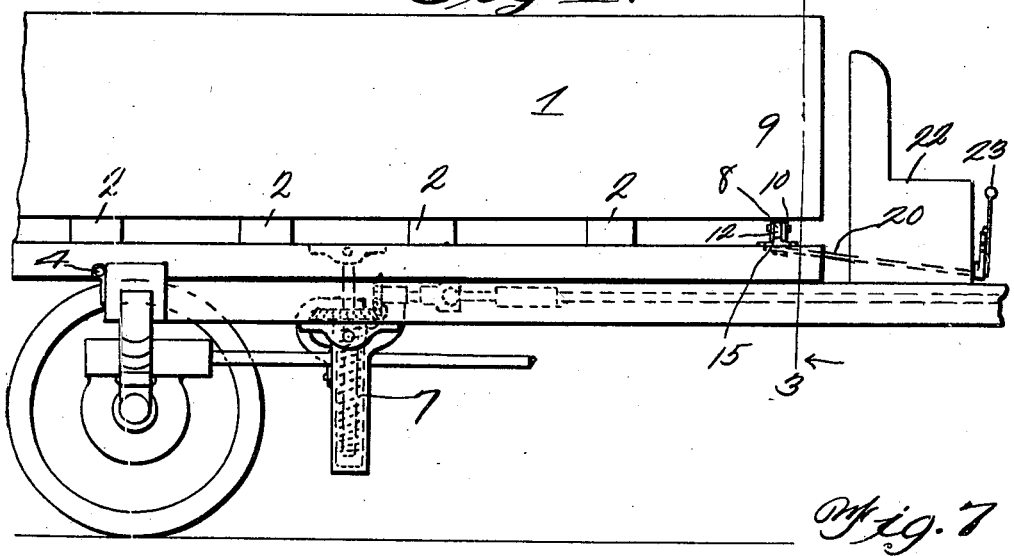
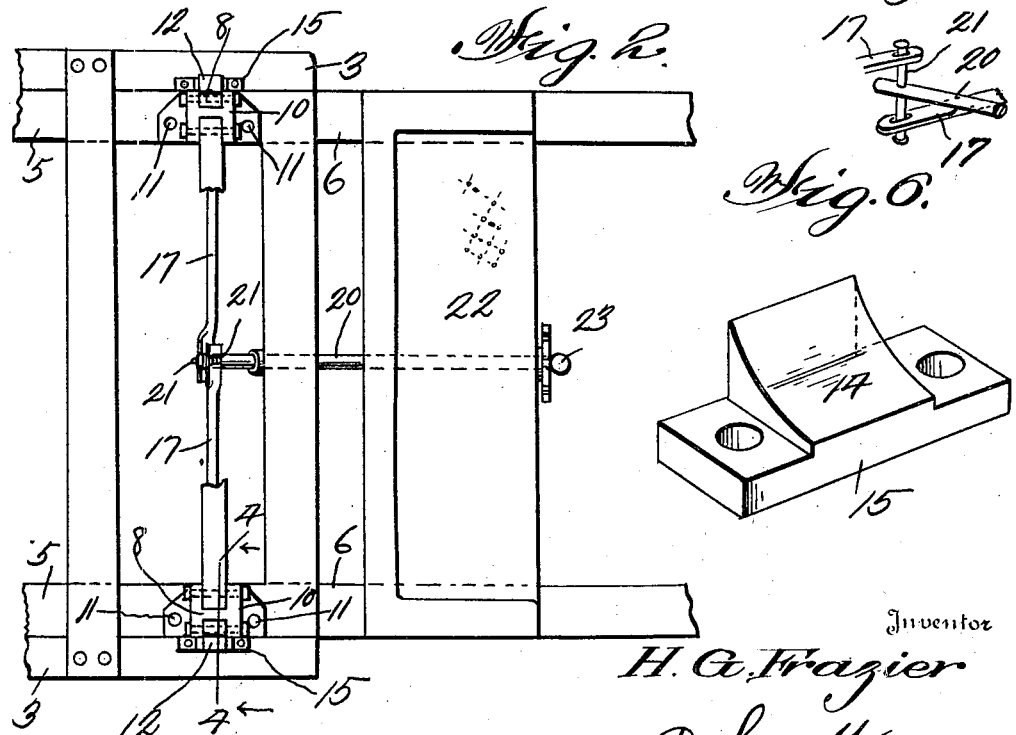
Inventor
H. G. Frazier
By D. Swift
Attorney June 5, 1923.
H. G. FRAZIER
WAGON DUMP BODY LATCH
Filed Aug. 10, 1922
1,457,357
2 Sheets-Sheet 2
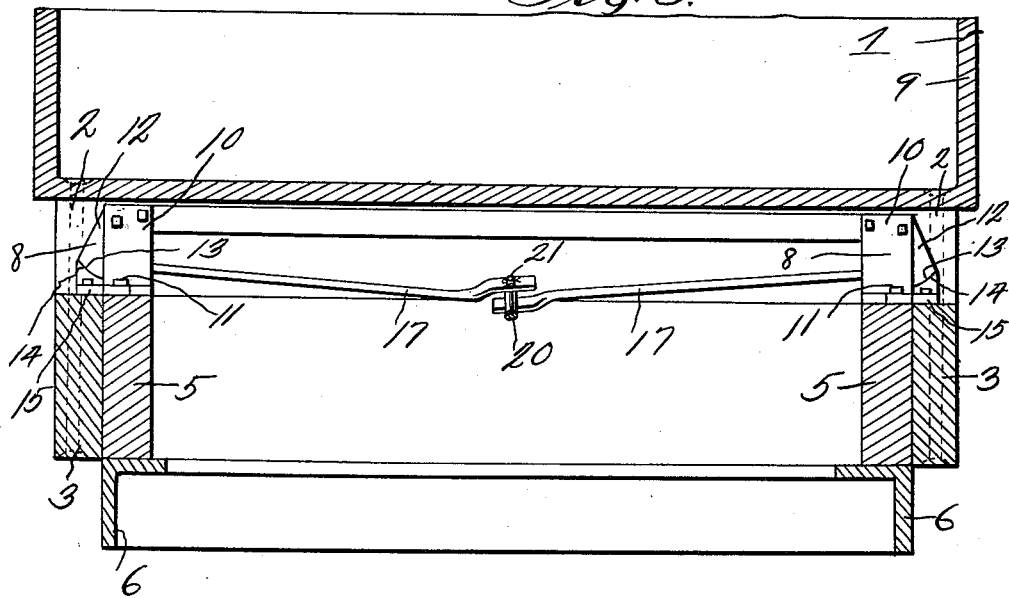
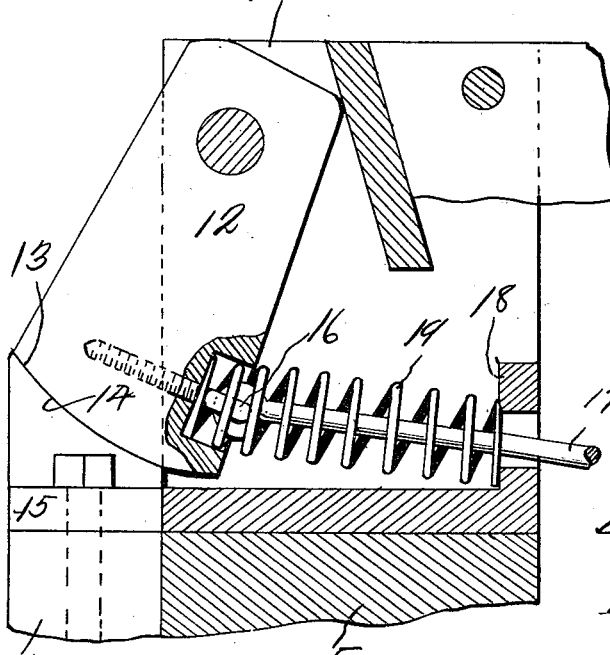
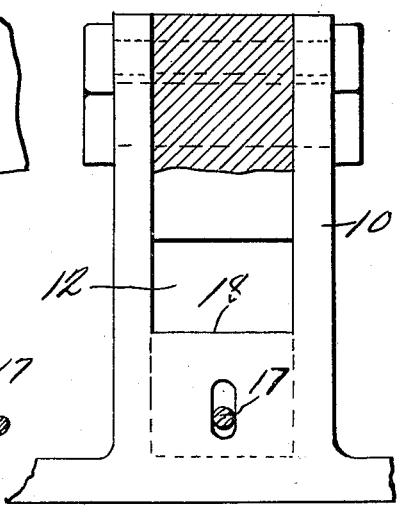
Inventor
H. G. Frazier
By D. Swift
Attorney Patented June 5, 1923.

1,457,357

UNITED STATES PATENT OFFICE.

HOMER G. FRAZIER, OF LA FAYETTE, INDIANA.

WAGON-DUMP-BODY LATCH.

Application filed August 10, 1922. Serial No. 580,890.

*To all whom it may concern:*

Be it known that I, HOMER G. FRAZIER, a citizen of the United States, residing at La Fayette, in the county of Tippecanoe, State of Indiana, have invented a new and useful Wagon-Dump-Body Latch; and I do hereby declare the following to be a full, clear, and exact description of the invention, such as will enable others skilled in the art to which it appertains to make and use the same.

The invention relates to latches for wagon dump bodies, and has for its object to provide a device of this character wherein plates are carried by the free end of the dump body, with which plates, when the dump body is lowered, eccentric dogs cooperate under spring tension for taking up the play and movement of the dump body incident to jar, as the vehicle passes over rough surfaces.

A further object is to provide the pivoted cam dogs with inwardly extending rods, which rods are controlled by a forwardly extending shaft against the action of the coiled spring.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a side elevation of a dump wagon showing the device applied thereto.

Figure 2 is a top plan view of a portion of the dump wagon frame and the frame of the body, showing the latching device applied thereto.

Figure 3 is a vertical transverse sectional view through the vehicle taken on line 3—3 of Figure 1.

Figure 4 is a detail sectional view taken on line 4—4 of Figure 2.

Figure 5 is a rear elevation of one of the dog carrying brackets.

Figure 6 is a perspective view of one of the cam plates.

Figure 7 is a detail perspective view of the rear end of the operating rod showing its connections with the inner ends of the dog controlling rods.

Referring to the drawings, the numeral 1 designates a dump body which is supported on transversely disposed sills 2, which sills are secured to the longitudinally disposed bars 3, said bars being hingedly connected at 4 to the side rails 5, which are secured in any suitable manner on the side rails 6 of the vehicle frame. When the dump body is lowered the bars 3 move into registration with the rails 5 as clearly shown in Figure 3. It has been found that where a body hoisting mechanism 7 is used, such for instance as set forth in the application by applicant the 22nd day of June 1920, Serial No. 390,832, that considerable strain is on the hoisting mechanism incident to movement of the dump body 1 as the vehicle moves over rough ground, which movement springs the hoisting mechanism, and causes wear on the movable parts thereof, which parts are constantly moving incident to the vibration, and strain. To obviate the above difficulty, latching devices 8 are provided adjacent the forward end 9 of the dump body 1, which latching devices hold the forward end of the dump body against movement in such a manner that all play of the body is prevented by eccentric dogs cooperating with plates.

The latching devices comprise brackets 10, which are secured to the upper sides of the rail 5 by means of bolts 11 and pivoted dogs 12, which dogs are pivotally mounted in the brackets 10 and are provided with eccentric ends 13, which ends 13 engage the curved surfaces 14 of the plates 15 which are carried by the upper sides of the bars 5, in such a manner as to hold the free end 9 of the body 1 in downward position after the same has been lowered. Connected to the inner sides of the dogs 12 at 16 are inwardly extending controlling rods 17, and surrounding said rods 17 and interposed between the walls 18 of the brackets and the dogs 12 are coiled springs 19, which normally force the free ends of the dogs 12 outwardly in such a manner that any play which may develop between the bars 5 and 3 will be immediately taken up by the eccentric jamming action and the body 1 positively held against movement. When the body 1 is lowered from a raised position, the bars 3 engage the pivoted dogs 12, and force the same inwardly until the bars 3 pass into registration with the bars 5, at which time the springs 19 force the dogs outwardly into cooperative engagement with the plates 15. The inner ends of the rods 17 are connected to a forwardly extending operating shaft 20 by means of pins 21, which extend through apertures in the rods 17. It will be seen that when the operating shaft 20 is rotated that the rods 17 may be moved simultaneously towards each other, thereby moving the cam dogs 12 inwardly and allowing the dump body to be raised. Shaft 20 extends forwardly under the operator's seat 22 and is provided with an operating handle 23, by means of which the operator may rock the shaft 20, for controlling the cam dog 12.

From the above it will be seen that a latching device is provided for dump bodies of vehicles, which latching device is simple in construction, positive in its operation and constructed in such a manner that movement of the body in relation to the vehicle frame is obviated.

The invention having been set forth what is claimed as new and useful is:—

1. The combination with a pivoted dump body carried by a frame, of latching means carried by the opposite sides of the frame, said latching means comprising downwardly and outwardly extending pivoted dogs in the path of the side rails of the body, spring means for normally forcing said dogs outwardly, plates carried by the upper sides of the side rails of the body and adapted to be engaged by the pivoted dogs, said pivoted dogs and plates being provided with eccentric engaging surfaces.

2. The combination with a pivoted dump body carried by a frame, of latching means carried by the opposite sides of the frame, said latching means comprising brackets, pivoted dogs carried by said brackets and extending downwardly and outwardly, rails carried by the body in the path of the pivoted dogs, plates carried by the upper sides of the rails, said plates and dogs being provided with eccentric engaging surfaces, inwardly extending rods connected to the dogs, spring means for forcing said dogs outwardly and an operating shaft cooperating with the inner ends of the rods and forming means whereby said dogs may be simultaneously controlled.

In testimony whereof I have signed my name to this specification in the presence of two subscribing witnesses.

HOMER G. FRAZIER.

Witnesses:
    FRANK KIMMEL,
    BLANCH FINFROCK.